US007986857B2

(12) United States Patent
Kim et al.

(10) Patent No.: US 7,986,857 B2
(45) Date of Patent: Jul. 26, 2011

(54) APPARATUS AND METHOD FOR GENERATING IMAGE USING MULTI-CHANNEL FILTER

(75) Inventors: Yun-tae Kim, Suwon-si (KR); Heui-keun Choh, Seoul (KR); Gee-young Sung, Daegu-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1016 days.

(21) Appl. No.: 11/889,430

(22) Filed: Aug. 13, 2007

(65) Prior Publication Data

US 2008/0181490 A1 Jul. 31, 2008

(30) Foreign Application Priority Data

Jan. 25, 2007 (KR) .................. 10-2007-0007986

(51) Int. Cl.
*G06K 9/32* (2006.01)
*G06K 9/40* (2006.01)
*H04N 9/83* (2006.01)
*H04N 1/46* (2006.01)

(52) U.S. Cl. ........ 382/284; 382/260; 382/300; 348/277; 358/515

(58) Field of Classification Search .................. 382/162, 382/173, 260, 276, 284, 300, 312; 348/234, 348/273, 277, 278, 280, 222.1; 358/1.9, 358/515, 518, 525; 455/450, 464
See application file for complete search history.

(56) References Cited

U.S. PATENT DOCUMENTS

| | | | | |
|---|---|---|---|---|
| 5,978,023 A * | 11/1999 | Glenn | ............... | 348/234 |
| 6,809,765 B1 * | 10/2004 | Tao | ............... | 348/273 |
| 7,023,529 B2 | 4/2006 | Han | ............... | 355/71 |
| 2005/0018223 A1 * | 1/2005 | Debevec et al. | ............... | 358/1.9 |
| 2005/0151860 A1 * | 7/2005 | Silverstein et al. | ............... | 348/272 |
| 2005/0174448 A1 | 8/2005 | Kuboi | | |

FOREIGN PATENT DOCUMENTS

| | | |
|---|---|---|
| CN | 1655045 | 8/2005 |
| JP | 5-56446 | 3/1993 |
| JP | 7-107497 | 4/1995 |
| JP | 8-172635 | 7/1996 |
| KR | 2000-0068553 | 11/2000 |
| KR | 10-2005-0122746 | 12/2005 |

OTHER PUBLICATIONS

Office Action dated Apr. 21, 2008 in corresponding Korean Patent Application No. 10-2007-0007986 (3 pages).
Chinese Office Action issued Nov. 2, 2007 in corresponding Chinese Patent Application No. 2006101363347.
Office Action dated Oct. 8, 2008 in Korean Patent Application No. 10-2007-0007986 (4 pp).

* cited by examiner

Primary Examiner — Kanji Patel
(74) Attorney, Agent, or Firm — Staas & Halsey LLP

(57) ABSTRACT

Provided are an apparatus and method for generating an image using a multi-channel filter. More particularly, provided are an apparatus and method for generating an image using a multi-channel filter, wherein images input into a plurality of image sensors are allowed to pass through different filters, each of which includes a plurality of channels, and segmented images passed through the filters are combined to produce a desired image. The apparatus includes a filter unit including a plurality of filters having different patterns with respect to a plurality of image channels and filtering images input into the filters, an image sensing unit including a plurality of image sensors sensing images filtered through the plurality of the filters, an interpolation unit calculating image channel values of pixels of the sensed images, and an image combination unit assigning the calculated image channel values to corresponding pixel positions to generate a single desired image.

21 Claims, 9 Drawing Sheets

A FILTER

B FILTER

C FILTER

D FILTER

A FILTER

B FILTER

C FILTER

D FILTER

A FILTER

B FILTER

C FILTER

D FILTER

A FILTER

B FILTER

C FILTER

D FILTER

APPARATUS AND METHOD FOR GENERATING IMAGE USING MULTI-CHANNEL FILTER

CROSS-REFERENCE TO RELATED APPLICATION

This application claims priority from Korean Patent Application No. 10-2007-0007986 filed on Jan. 25, 2007 in the Korean Intellectual Property Office, the disclosure of which is incorporated herein by reference in its entirety.

BACKGROUND OF THE INVENTION

1. Field of the Invention

The present invention relates to an apparatus and method for generating an image using a multi-channel filter, and more particularly, to an apparatus and method for generating an image using a multi-channel filter, wherein images input into a plurality of image sensors are allowed to pass through different filters, each of which includes a plurality of channels, and segmented images passed through the filters are combined to produce a desired image.

2. Description of the Related Art

Because of the development of technology, users can produce various digital images. In particular, with the distribution of personal computers (PCs) and the shift from using analog cameras to digital cameras, the number of users producing digital still images is being rapidly increased. With the advent of camcorders, users producing digital moving pictures are also emerging. As the functions of digital cameras or camcorders are adapted to cellular phones, the number of users who produce digital images is increasing.

A camera module generally includes a lens and an image sensor. The lens serves to focus light reflected from a subject, and the image sensor serves to sense and convert the focused light to electrical image signals. The image sensor can be largely composed of a camera tube and a solid-state image sensor. A charge coupled device (CCD) or a metal oxide silicon (MOS) device is a representative example of the solid-state image sensor.

Generally, in order to acquire color images, three color channels, i.e., red (R), green (G), and blue (B) are used. As such, since images are created using a limited number of color channels, desired color images may not be produced.

In this regard, a 3×2 filter may be implemented by adding three channels to a 2×2 filter for filtering RGB color channels. However, as the size of a filter increases, target images may be blurred.

Therefore, it is necessary to produce desired images using a plurality of color channels without changing the size of a filter.

SUMMARY OF THE INVENTION

An object of the present invention is to produce a desired image by allowing images input into a plurality of image sensors to pass through different filters, each of which includes a plurality of channels, and combining segmented images passed through the filters.

Another object of the present invention is to apply multi-channel colors to a desired output image while maintaining a general shape of a filter.

According to an aspect of the present invention, there is provided an apparatus for generating an image using a multi-channel filter, the apparatus including a filter unit including a plurality of filters having different patterns with respect to a plurality of image channels and filtering images input into the filters, an image sensing unit including a plurality of image sensors sensing images filtered through the plurality of the filters, an interpolation unit calculating image channel values of pixels of the sensed images, and an image combination unit assigning the calculated image channel values to corresponding pixel positions to generate a single desired image.

According to another aspect of the present invention, there is provided a method for generating an image using a multi-channel filter, the method including filtering input images through a plurality of filters having difference patterns with respect to a plurality of image channels; sensing the filtered images using a plurality of image sensors; calculating image channel values of pixels of the sensed images; and assigning the calculated image channel values to corresponding pixel positions to generate a single desired image.

BRIEF DESCRIPTION OF THE DRAWINGS

The patent or application file contains at least one drawing executed in color. Copies of this patent or patent application publication with color drawing(s) will be provided by the Office upon request and payment of the necessary fee. The above and other features and advantages of the present invention will become more apparent by describing in detail exemplary embodiments thereof with reference to the attached drawings in which.

DETAILED DESCRIPTION OF THE INVENTION

Figure 1:
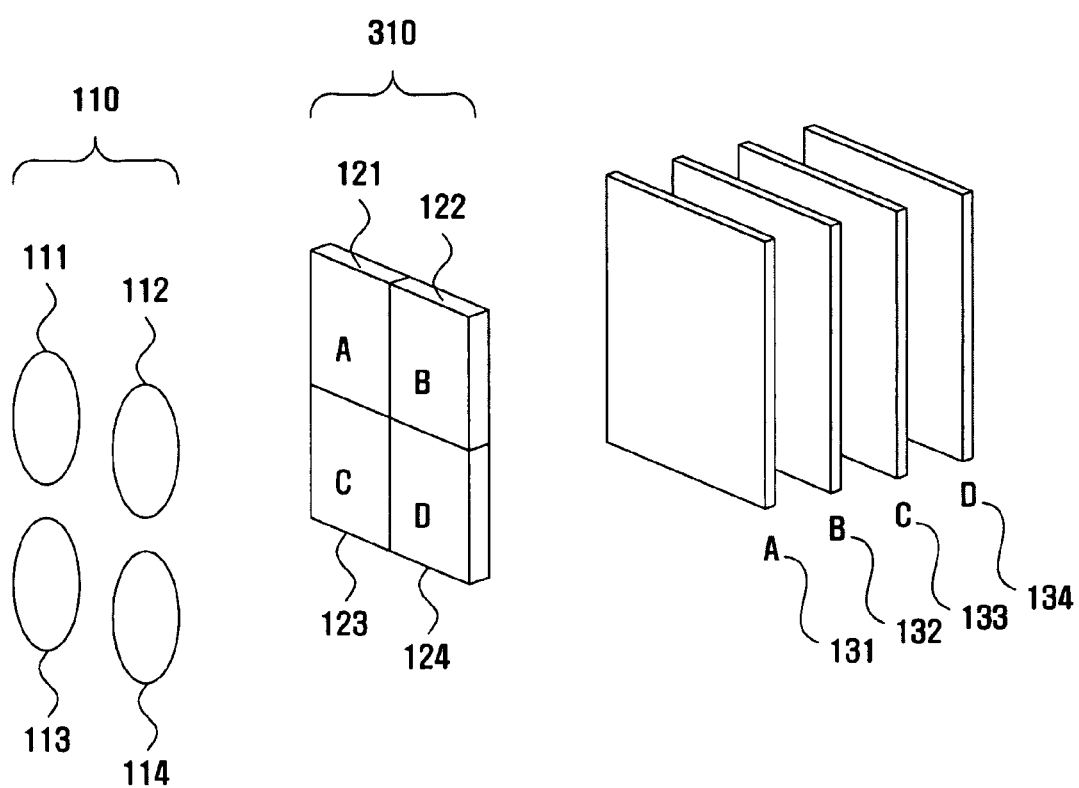
FIG. 1 is a view illustrating a filter unit according to an embodiment of the present invention.

Advantages and features of the present invention and methods of accomplishing the same may be understood more readily by reference to the following detailed description of preferred embodiments and the accompanying drawings. The present invention may, however, be embodied in many different forms and should not be construed as being limited to the embodiments set forth herein. Rather, these embodiments are provided so that this disclosure will be thorough and complete and will fully convey the concept of the invention to those skilled in the art, and the present invention will only be defined by the appended claims. Like reference numerals refer to like elements throughout the specification.

The present invention will now be described more fully with reference to the accompanying drawings, in which exemplary embodiments of the invention are shown.

FIG. 1 is a view illustrating a filter unit (310) including four filters according to an embodiment of the present invention. Referring to FIG. 1, the filter unit 310 includes four filters 121, 122, 123, and 124. Thus, it is preferable to use four lenses 111, 112, 113, and 114 for focusing incident light so as to correspond to the four filters 121, 122, 123, and 124, as illustrated in FIG. 1. However, it should be understood that images can be input into four filters via one or two lenses.

That is, the number of lenses is not limited, and a plurality of the lenses 111, 112, 113, and 114 may be diversely arranged in the same plane. For example, the lenses 111, 112, 113, and 114 may be arranged linearly in a horizontal or vertical direction or in a matrix form. For the purpose of convenience of illustration, the specification will be described with a view that a lens unit (see 110 of FIG. 1) includes four lenses, and the lenses are arranged in a 2×2 matrix.

According to the present invention, a filter unit may include a plurality of filters. That is, as shown in FIG. 1, the filter unit 310 includes four filters 121, 122, 123, and 124. Here, the filters 121, 122, 123, and 124 have different patterns with respect to a plurality of image channels. For example, the first filter 121 may be patterned to filter red and green (G) channels, and the second filter 122 may be patterned to filter cyan and magenta (M) channels.

Figure 2:
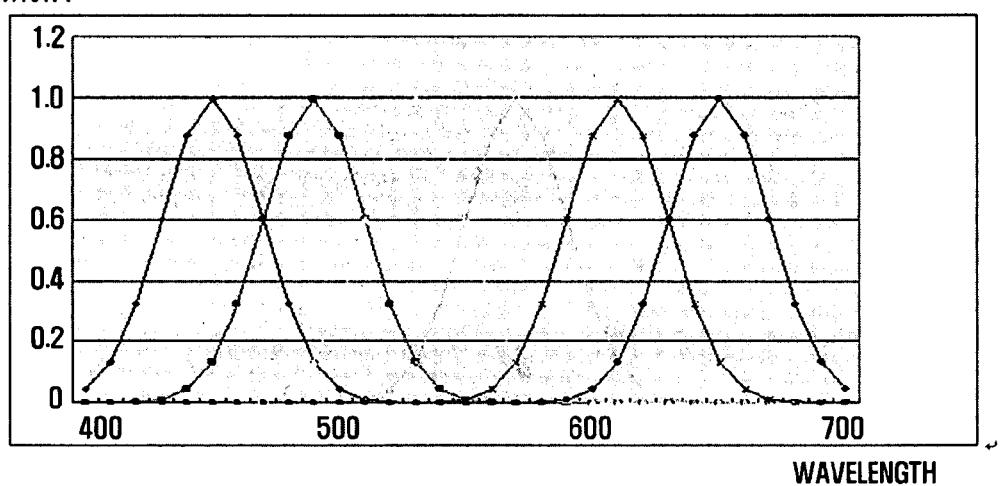
FIG. 2 is a view illustrating the sensitivity of image channels with respect to a wavelength.

As used herein, the term "image channels" refer to predetermined regions of color spaces which exhibit different sensitivity characteristics with respect to a wavelength, as illustrated in FIG. 2. In the present invention, the image channels include a red (R) channel, a green (G) channel, a blue (B) channel, a cyan (C) channel, a magenta (M) channel, and a yellow (Y) channel.

Referring again to FIG. 1, images 131, 132, 133, and 134 filtered through the filter unit 310 are combined to create a single desired image. Here, the filtered images 131, 132, 133, and 134 include only filtered image channel components. Thus, non-filtered image channel components must be acquired through interpolation.

That is, a non-filtered image channel value of a pixel is calculated based on image channel values of pixels adjacent to the pixel. Here, the "image channel values of adjacent pixels" are meant to include the values of image channels filtered through all the filters 121, 122, 123, and 124 constituting the filter unit 310. Interpolation using adjacent pixels will later be described in detail with reference to FIG. 8.

Meanwhile, the filters 121, 122, 123, and 124 of the filter unit 310 may be structured such that an image channel (hereinafter, referred to as "first image channel") having higher brightness than the other image channels is not interpolated. That is, the filters 121, 122, 123, and 124 of the filter unit 310 may be structured such that first pixel channels are filtered through one or more of the filters 121, 122, 123, and 124 constituting the filter unit 310 and mapped in all different pixel regions of one or more pixel blocks. For example, first image channels may be filtered through the top-left of a first filter, the bottom-left of a second filter, the top-right of a third filter, and the bottom-right of a fourth filter, or alternatively, may be filtered through a single filter and mapped in all pixel regions of a pixel block. Thus, the value of a first image channel of a predetermined pixel region is not calculated through interpolation, but the value of a first image channel mapped in a corresponding pixel region of an image which is filtered through each filter can be used in itself.

In a case where the above-described six image channels, i.e., a red (R) channel, a green (G) channel, a blue (B) channel, a cyan (C) channel, a magenta (M) channel, and a yellow (Y) channel, are filtered through the filter unit 310, a first image channel, i.e., an image channel having higher brightness than another image channel (hereinafter, referred to as "second image channel") includes the green (G) channel and the cyan (C) channel. The yellow (Y) channel may also be included in the first image channel.

Figure 3:
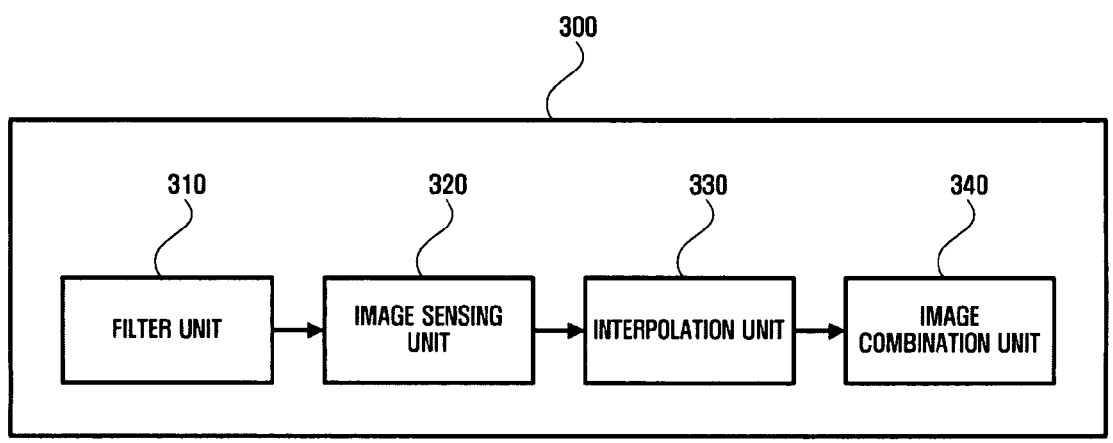
FIG. 3 is a block diagram illustrating an apparatus for generating an image using a multi-channel filter according to an embodiment of the present invention.

FIG. 3 is a block diagram illustrating an apparatus for generating an image using a multi-channel filter according to an embodiment of the present invention. Referring to FIG. 3, an apparatus (hereinafter, referred to as "image generating apparatus") 300 for generating an image using a multi-channel filter includes a filter unit 310, an image sensing unit 320, an interpolation unit 330, and an image combination unit 340.

The filter unit 310 includes a plurality of filters having different patterns with respect to a plurality of image channels and filtering input images. Here, the plurality of the filters may be patterned such that the number of filtering operations of a first image channel is greater than that of a second image channel. Moreover, the plurality of the filters may be patterned such that a first pixel channel is filtered and mapped in all different pixel regions of one or more of all pixel blocks constituting images. A detailed description thereof will be provided later with reference to FIGS. 4 through 7.

The image sensing unit 320 includes a plurality of image sensors sensing respective images filtered through the plurality of the filters. The image sensors may be charge coupled devices (CCDs) or metal oxide silicon (MOS) devices.

Preferably, the number of the image sensors may be the same as the number of the filters. For example, when four filters are used, the number of the image sensors may be four. That is, the image sensing unit 320 is structured such that images filtered through the filters can be respectively sensed by the image sensors.

The interpolation unit 330 serves to calculate the image channel values of pixels in the images sensed by the image sensing unit 320. In the images filtered through the filter unit 310, a predetermined pixel region filtered through a predetermined filter includes only a single image channel component. Thus, the other image channel components for the predetermined pixel region must be extracted from image channel components filtered through the other filters. Here, the interpolation unit 330 can calculate an image channel component value of a predetermined pixel region based on the values of image channels mapped in pixel regions adjacent to the predetermined pixel region. For example, an image channel value of a pixel region of interest can be determined as a mean value of image channel values of pixels adjacent to the pixel region of interest.

Meanwhile, since the filters of the filter unit 310 are patterned such that a first image channel is filtered and mapped in all different pixel regions of one or more of all pixel blocks constituting images, a first image channel component of a pixel region of interest is not interpolated from image channel values of pixels adjacent to the pixel region of interest, but can be determined as the value of an image channel mapped in a pixel region corresponding to the pixel region of interest.

That is, when an image channel to be interpolated (hereinafter, referred to as "to-be-interpolated image channel") of a pixel to be interpolated (hereinafter, referred to as "to-be-interpolated pixel") is a first image channel, the interpolation unit 330 determines the value of a first image channel mapped in the position of a pixel corresponding to a to-be-interpolated pixel in a plurality of images sensed by a plurality of image sensors as an image channel value to be assigned to the to-be-interpolated pixel. When a to-be interpolated image channel of a to-be-interpolated pixel is a second image channel, the interpolation unit 330 determines a value calculated using image channel values of pixels adjacent to a to-be-interpolated pixel in a plurality of images sensed by a plurality of image sensors as an image channel value to be assigned to the to-be-interpolated pixel.

Here, the interpolation unit 330 compares a difference between image channel values of two horizontally (left and right) adjacent pixels to a to-be-interpolated pixel in a plurality of images sensed by a plurality of image sensors and a difference between two vertically (top and bottom) adjacent pixels to the to-be-interpolated pixel, and determines a mean value of image channel values of adjacent pixels having a smaller difference as an image channel value to be assigned to the to-be-interpolated pixel. When a difference between image channel values of two horizontally adjacent pixels to a to-be-interpolated pixel in a plurality of images sensed by a plurality of image sensors is the same as a difference between two vertically adjacent pixels to the to-be-interpolated pixel, the interpolation unit 330 determines a mean value of the image channel values of the two horizontally adjacent pixels and the two vertically adjacent pixels as an image channel value to be assigned to the to-be-interpolated pixel.

This can be given by Equations 1-3 below. That is, when a difference between image channel values of two vertically adjacent pixels is smaller than a difference between image channel values of two horizontally adjacent pixels, an image channel value of a to-be-interpolated pixel is determined by Equation 1 below:

$$P_{current} = \frac{P_{top} + P_{bottom}}{2} \qquad <\text{Equation 1}>$$

where $P_{current}$ denotes an image channel value of a to-be-interpolated pixel, $P_{top}$ denotes an image channel value of a top adjacent pixel to the to-be-interpolated pixel, and $P_{bottom}$ denotes an image channel value of a bottom adjacent pixel to the to-be-interpolated pixel.

When a difference between image channel values of two horizontally adjacent pixels is smaller than a difference between image channel values of two vertically adjacent pixels, an image channel value of a to-be-interpolated pixel is determined by Equation 2 below:

$$P_{current} = \frac{P_{left} + P_{right}}{2} \qquad <\text{Equation 2}>$$

where $P_{current}$ denotes an image channel value of a to-be-interpolated pixel, $P_{left}$ denotes an image channel value of a left adjacent pixel to the to-be-interpolated pixel, and $P_{right}$ denotes an image channel value of a right adjacent pixel to the to-be-interpolated pixel.

When a difference between image channel values of two vertically adjacent pixels and a difference between image channel values of two horizontally adjacent pixels are the same or fall within a predetermined critical range, an image channel value of a to-be-interpolated pixel is determined by Equation 3 below:

$$P_{current} = \frac{P_{top} + P_{bottom} + P_{left} + P_{right}}{4} \qquad <\text{Equation 3}>$$

where $P_{current}$ denotes an image channel value of a to-be-interpolated pixel, $P_{top}$ denotes an image channel value of a top adjacent pixel to the to-be-interpolated pixel, $P_{bottom}$ denotes an image channel value of a bottom adjacent pixel to the to-be-interpolated pixel, $P_{left}$ denotes an image channel value of a left adjacent pixel to the to-be-interpolated pixel, and $P_{right}$ denotes an image channel value of a right adjacent pixel to the to-be-interpolated pixel.

Equations 1-3 are applied to calculate an image channel value of a to-be-interpolated pixel using image channel values of pixels adjacent to the to-be-interpolated pixel. Equations 1-3 can be applied when a to-be-interpolated image channel of a to-be-interpolated pixel is a second image channel. That is, when to-be-interpolated image channels are the above-described six image channels, Equations 1-3 can be applied to calculate the values of red, blue, magenta, and yellow (Y) channels.

The image combination unit 340 serves to generate a single desired image by assigning calculated image channel values into their corresponding pixel positions. The desired image can be output through a display unit (not shown) capable of displaying the image.

FIGS. 4 through 7 are views illustrating filters having different patterns according to embodiments of the present invention. Here, four filters having different patterns are illustrated. That is, an image generating apparatus according to an embodiment of the present invention can generate an image using a filter unit including a plurality of filters illustrated in FIG. 4, 5, 6, or 7.

The filters illustrated in FIGS. 4 through 7 are commonly patterned such that the number of filtering operations of a first image channel is greater than the number of filtering operations of a second image channel.

That is, a green (G) channel and a cyan (C) channel, which are first image channels, can each be filtered through a filter unit and mapped in four pixel regions, but the other channels except the green and cyan (C) channels can be filtered through the filter unit and mostly mapped in two pixel regions.

A filter unit (see 310 of FIG. 3) may include a plurality of filters that are patterned such that first image channels are filtered and mapped in all different pixel regions of one or more of all pixel blocks constituting images. That is, referring to FIG. 4, green (G) channels, which are first image channels, are filtered through the top-right and bottom-left of a filter A, and at the same time, filtered through the top-left and bottom-right of a filter D. That is, the green (G) channels are filtered and mapped in all four different pixel regions of four (2×2) pixel blocks. Similarly, cyan (C) channels, which are first image channels, are filtered through the top-right and bottom-left of a filter B, and at the same time, filtered through the top-left and bottom-right of a filter C. That is, the cyan (C) channels are filtered and mapped in all four different pixel regions of four (2×2) pixel blocks.

Thus, a first image channel component of a pixel region of a pixel block is not interpolated using image channel values of its adjacent pixel regions, but can use the value of a first image channel mapped in a corresponding pixel region of another pixel block. For example, referring again to FIG. 4, a green (G) channel value to be assigned to the top-left pixel region of pixel regions of an image filtered through the filter A, B, or C, can be determined as a green (G) channel value of the top-left channel of image channels filtered through the filer D. A cyan (C) channel value to be assigned to the bottom-right pixel region of pixel regions of an image filtered through the filter A, B, or D can be determined as a cyan (C) channel value of the bottom-right channel of image channels filtered through the filter C.

Figure 8:
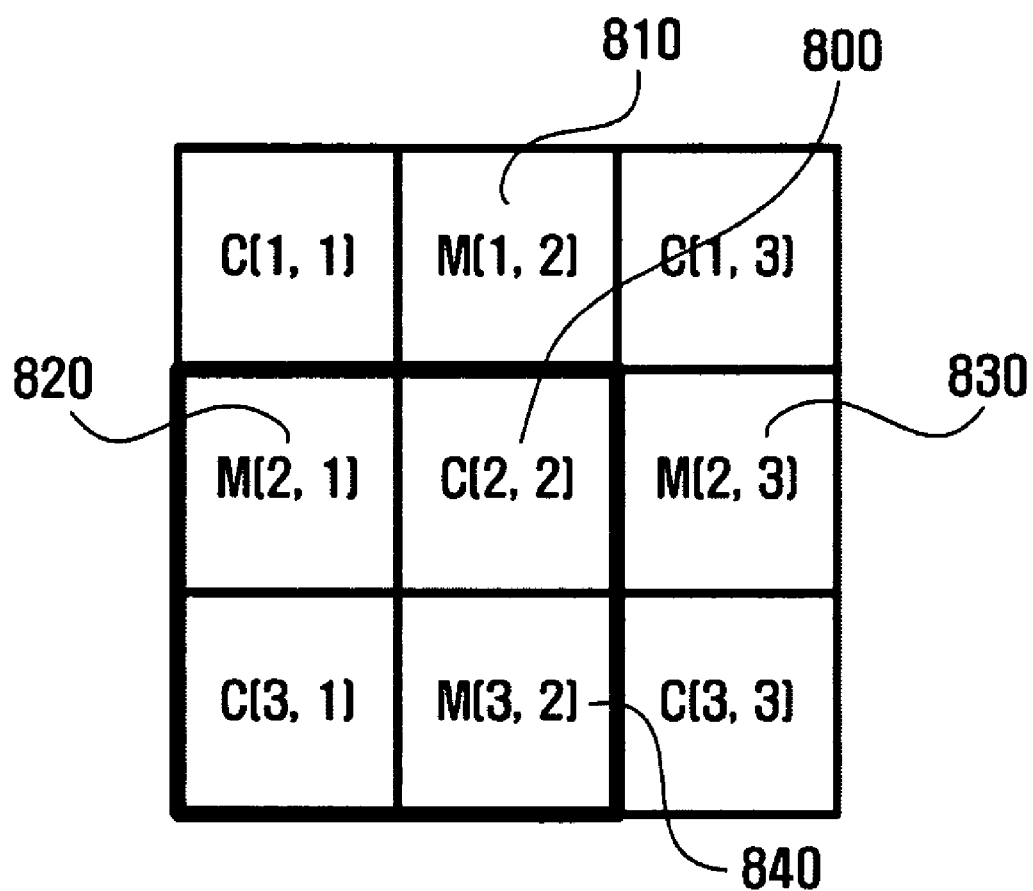
FIG. 8 is a view illustrating an interpolation according to an embodiment of the present invention.

Meanwhile, a second image channel component of a predetermined pixel region can be interpolated using Equations 1-3 as described above. The interpolation of the second image channel is illustrated in FIG. 8.

Figure 4:
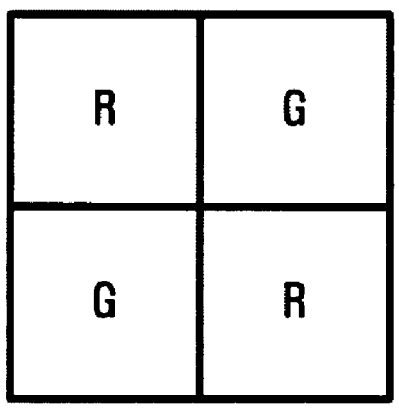
FIGS. 4 through 7 are views illustrating filters with different patterns according to embodiments of the present invention.
Figure 4:
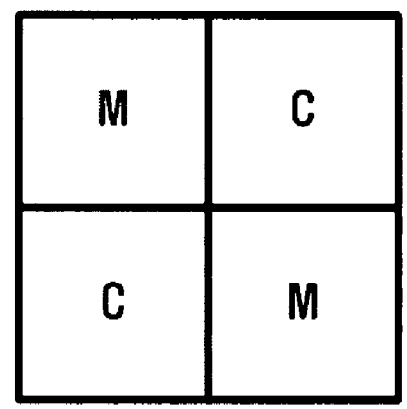
Figure 4:
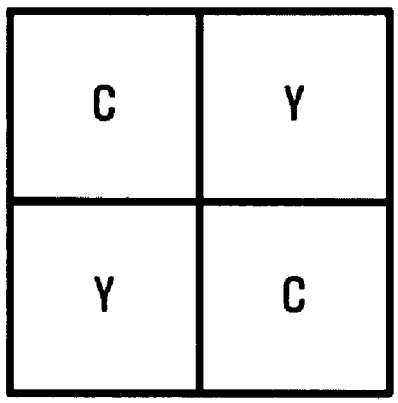
Figure 4:
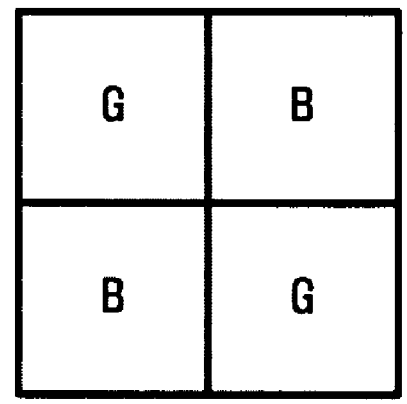
Figure 5:
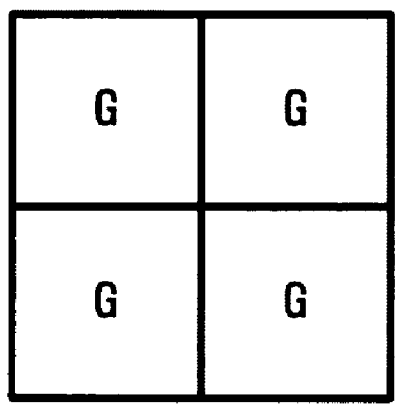
Figure 5:
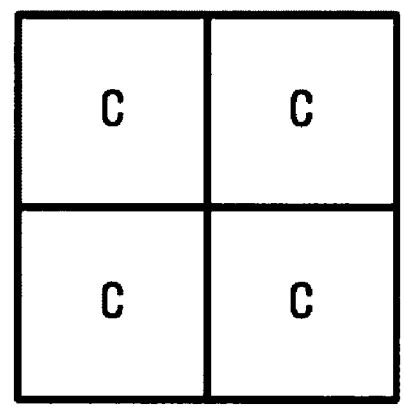
Figure 5:
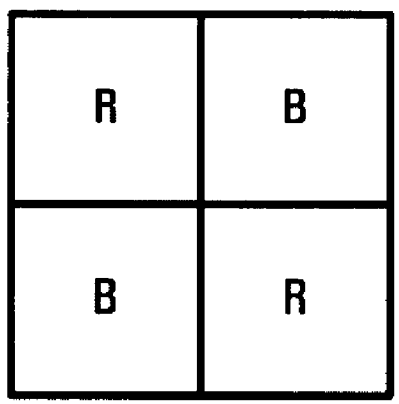
Figure 5:
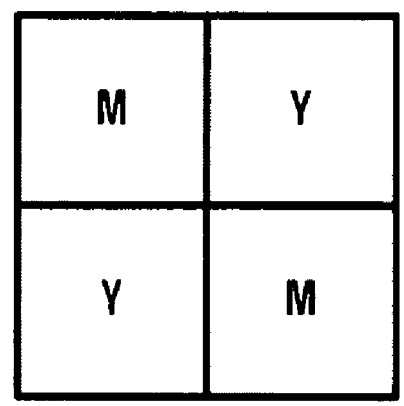
Figure 6:
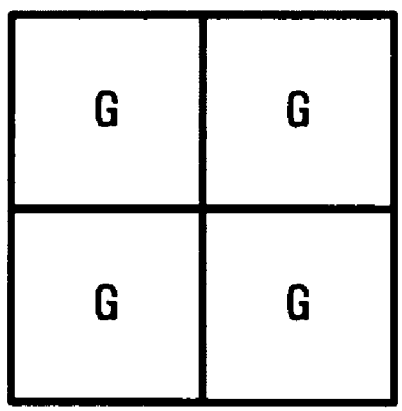
Figure 6:
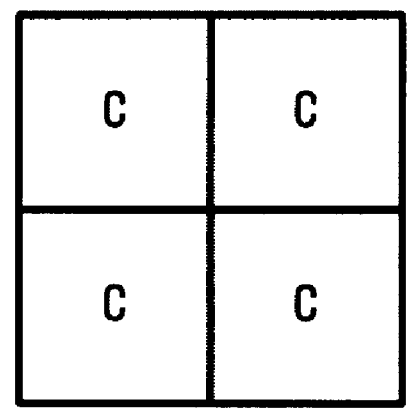
Figure 6:
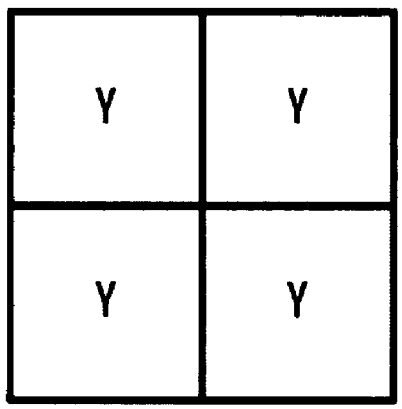
Figure 6:
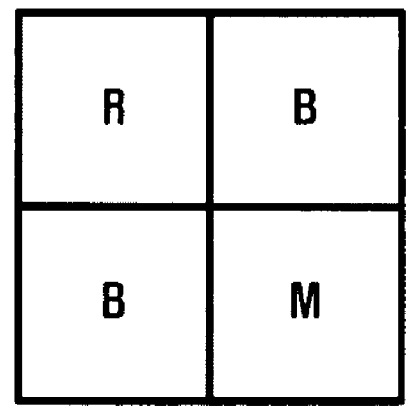
Figure 7:
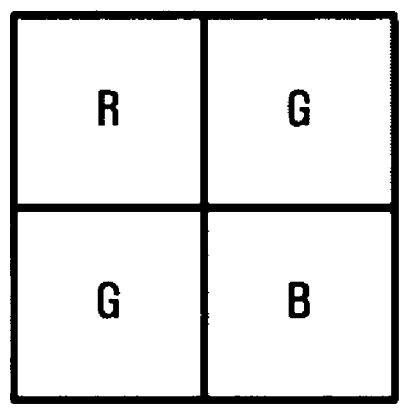
Figure 7:
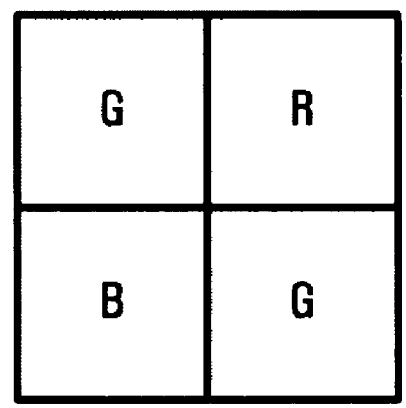
Figure 7:
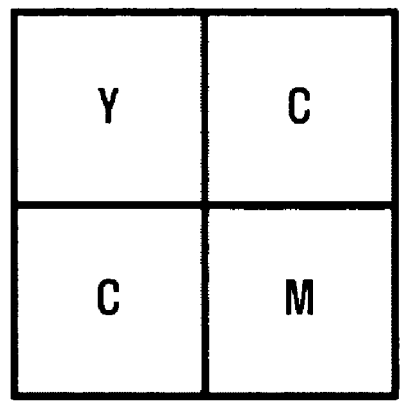
Figure 7:
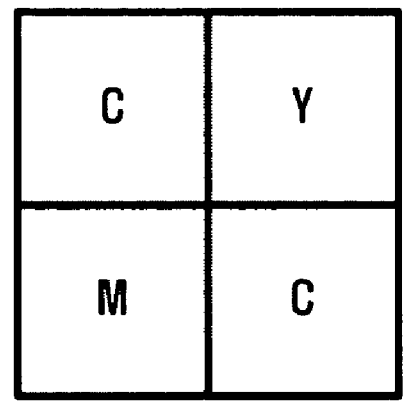

That is, when filtering is performed using the filter B of FIG. 4, a cyan (C) channel is mapped in a top-right pixel region. At this time, in order to extract a magenta (M) channel component in the top-right pixel region, image channel values of adjacent pixel regions must be used since no magenta (M) channel component is mapped in the corresponding pixel regions of images filtered through the filters A, C, and D.

The filter B of FIG. 4 is part of a real filter. Thus, when filtering is performed using a real filter, an image pattern illustrated in FIG. 8 can be acquired. Referring to FIG. 8, together with FIG. 3, when a pixel region C(2, 2) 800 is a pixel region to be interpolated to extract a magenta (M) channel component, the interpolation unit 330 calculates a difference (hereinafter, referred to as "horizontal difference") between an image channel value of a pixel region M(2, 1) 820 and an image channel value of a pixel region M(2, 3) 830 and a difference (hereinafter, referred to as "vertical difference") between an image channel value of a pixel region M(1, 2) 810 and an image channel value of a pixel region M(3, 2) 840, and compares the horizontal difference and the vertical difference. When the horizontal difference is smaller than the vertical difference, $$\frac{M(2, 1) + M(2, 3)}{2}$$

is determined as a magenta (M) channel value of the pixel region C(2, 2) 800. When the vertical difference is smaller than the horizontal difference, $$\frac{M(1, 2) + M(3, 2)}{2}$$

is determined as the magenta (M) channel value of the pixel region C(2, 2) 800. Meanwhile, when the horizontal difference is the same as the vertical difference, the interpolation unit 330 determines $$\frac{M(1, 2) + M(3, 2) + M(2, 1) + M(2, 3)}{4}$$

as the magenta (M) channel value of the pixel region C(2, 2) 800.

Figure 9:
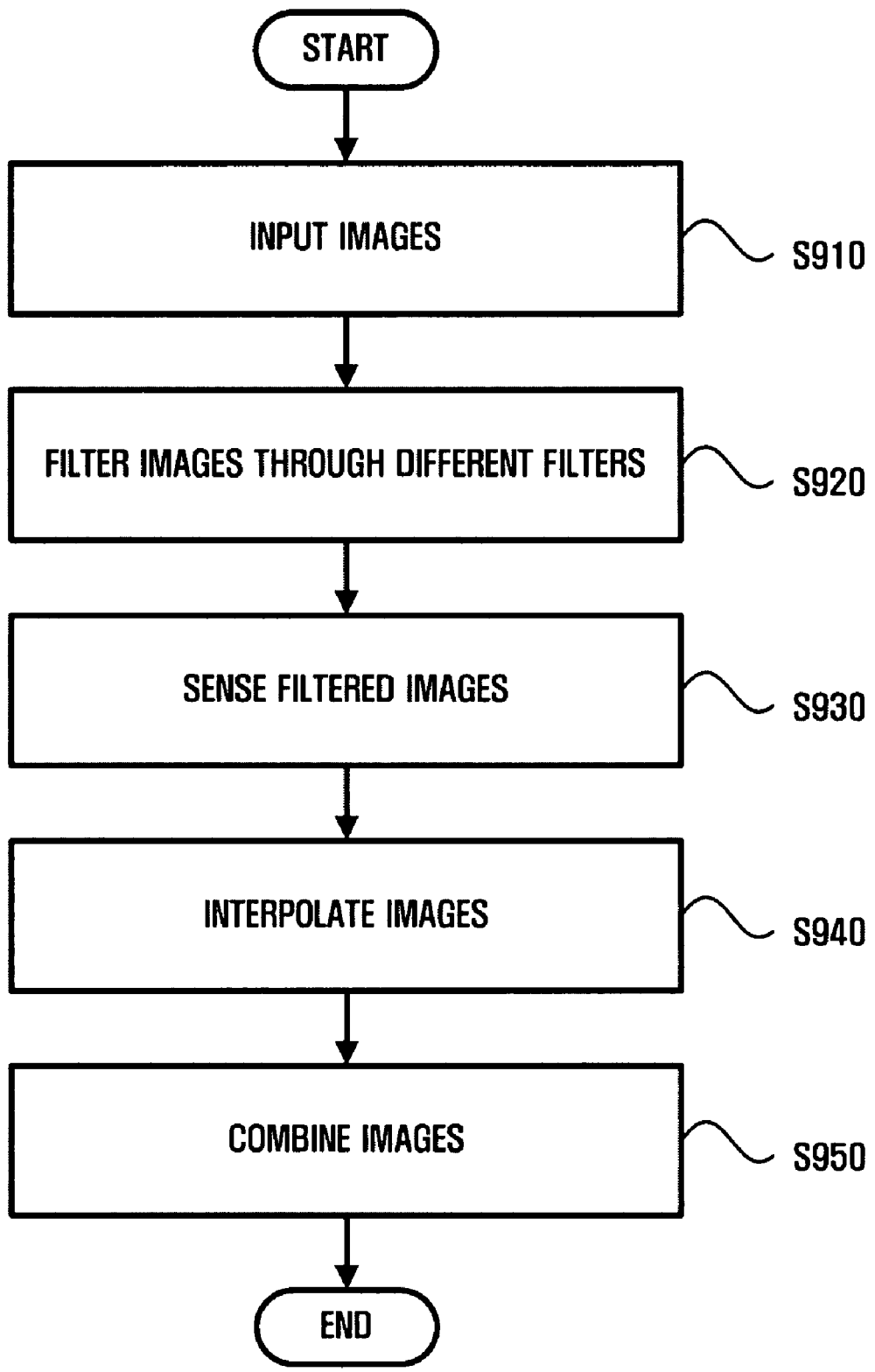
FIG. 9 is a flow diagram illustrating a method for generating an image using a multi-channel filter according to an embodiment of the present invention.

FIG. 9 is a flow diagram illustrating a method for generating an image using a multi-channel filter according to an embodiment of the present invention.

Referring to FIG. 9, together with FIG. 3, first, the image generating apparatus 300 receives images to generate a single image using a multi-channel filter (S910). In order to receive the images, the image generating apparatus 300 may include a plurality of lenses. The number of the lenses may be the same as the number of filters constituting the filter unit 310.

The received images are transmitted to the filter unit 310. The filter unit 310 filters the received images using a plurality of filters having different patterns with respect to image channels (S920).

The filtered images are transmitted to the image sensing unit 320, and the image sensing unit 320 senses the filtered images (S930). Here, the number of image sensors constituting the image sensing unit 320 may be the same as the number of the filters. That is, the image sensing unit 320 may include image sensors for sensing images filtered through the filters, respectively.

The images sensed by the image sensing unit 320 are subjected to interpolation in the interpolation unit 330 (S940). That is, pixel regions have predetermined image channel values as a result of the filtering. The values of non-filtered image channel components are calculated using image channel values of adjacent pixel regions or determined by the values of image channels filtered through another filters.

When the values of image channels to be interpolated are calculated by the interpolation unit 330, they are transmitted to the image combination unit 340. The image combination unit 340 assigns the calculated image channel values to corresponding pixel positions to generate a single desired image (S950).

As described above, an apparatus and method for generating an image using a multi-channel filter according to the present invention provide one or more of the following advantages.

First, images input into a plurality of image sensors are allowed to pass through different filters, each of which includes a plurality channels, and segmented images filtered through the filters are combined to generate a desired image. Thus, it is possible to acquire a desired image of a broad color gamut, to enhance a spectral-based auto white balance of an illuminator, and to sense an object reflection-based skin color.

Second, multi-channel colors can be applied to a desired image while maintaining a general shape of a filter, thereby preventing degradation of image quality of a desired image.

In concluding the detailed description, those skilled in the art will appreciate that many variations and modifications can be made to the preferred embodiments without substantially departing from the principles of the present invention. Therefore, the disclosed preferred embodiments of the invention are used in a generic and descriptive sense only and not for purposes of limitation.

What is claimed is:

1. An apparatus for generating an image using a multi-channel filter, the apparatus comprising:
   a filter unit including a plurality of filters, each of the plurality of filters having different patterns corresponding to a plurality of image channels and filtering images input into the filters;
   an image sensing unit including a plurality of image sensors sensing images filtered through the plurality of the filters;
   an interpolation unit calculating image channel values of pixels of the sensed images; and
   an image combination unit assigning the calculated image channel values to corresponding pixel positions to generate a single desired image.

2. The apparatus of claim 1, wherein the image channels comprise a red (R) channel, a green (G) channel, a blue (B) channel, a cyan (C) channel, a magenta (M) channel, and a yellow (Y) channel.

3. The apparatus of claim 1, wherein each of the plurality of the filters has different patterns such that the number of filtering operations of a predetermined image channel is greater than the number of filtering operations of the other image channels.

4. The apparatus of claim 3, wherein the plurality of the filters are patterned such that the predetermined image channel is filtered and mapped in all different pixel regions of one or more of all pixel blocks constituting the sensed images.

5. The apparatus of claim 3, wherein the predetermined image channel has a higher brightness than the other image channels.

6. The apparatus of claim 5, wherein the predetermined image channel comprises a green (G) channel and a cyan (C) channel.

7. The apparatus of claim 3, wherein when a to-be-interpolated image channel of a to-be-interpolated pixel is a predetermined image channel, the interpolation unit determines an image channel value of a predetermined image channel mapped in the position of a pixel corresponding to a to-be-interpolated pixel in the plurality of the images sensed by the plurality of image sensors as an image channel value to be assigned to the to-be-interpolated pixel.

8. The apparatus of claim 3, wherein when a to-be-interpolated image channel of a to-be-interpolated pixel is not a predetermined image channel, the interpolation unit determines a value calculated using image channel values of pixels adjacent to a to-be-interpolated pixel in the plurality of the images sensed by the plurality of image sensors as an image channel value to be assigned to the to-be-interpolated pixel.

9. The apparatus of claim 8, wherein the interpolation unit compares a difference between image channel values of two horizontally adjacent pixels to a to-be-interpolated pixel in the plurality of the images sensed by the plurality of the image sensors and a difference between image channel values of two vertically adjacent pixels to the to-be-interpolated pixel, and determines a mean value of the image channel values having a smaller difference as an image channel value to be assigned to the to-be-interpolated pixel.

10. The apparatus of claim 8, wherein the interpolation unit compares a difference between image channel values of two horizontally adjacent pixels to a to-be-interpolated pixel in the plurality of the images sensed by the plurality of the image sensors and a difference between image channel values of two vertically adjacent pixels to the to-be-interpolated pixel, and
wherein when the difference between the image channel values of the two horizontally adjacent pixels is the same as the difference between the image channel values of the two vertically adjacent pixels, the interpolation unit determines a mean value of the image channel values of the two horizontally adjacent pixels and the two vertically adjacent pixels as an image channel value to be assigned to the to-be-interpolated pixel.

11. A method for generating an image using a multi-channel filter, the method comprising:
filtering input images through a plurality of filters, each of the plurality of filters having different patterns corresponding to a plurality of image channels;
sensing the filtered images using a plurality of image sensors;
calculating image channel values of pixels of the sensed images; and
assigning the calculated image channel values to corresponding pixel positions to generate a single desired image.

12. The method of claim 11, wherein the image channels comprise a red (R) channel, a green (G) channel, a blue (B) channel, a cyan (C) channel, a magenta (M) channel, and a yellow (Y) channel.

13. The method of claim 11, wherein each of the plurality of the filters has different patterns such that the number of filtering operations of a predetermined image channel is greater than the number of filtering operations of the other image channels.

14. The method of claim 13, wherein the filtering of the input images comprises patterning the plurality of the filters such that the predetermined image channel is filtered and mapped in all different pixel regions of one or more of all pixel blocks constituting the sensed images.

15. The method of claim 13, wherein the predetermined image channel has a higher brightness than the other image channels.

16. The method of claim 15, wherein the predetermined image channel comprises a green (G) channel and a cyan (C) channel.

17. The method of claim 13, wherein when a to-be-interpolated image channel of a to-be-interpolated pixel is a predetermined image channel, the calculating of the image channel values comprises determining an image channel value of a predetermined image channel mapped in the position of a pixel corresponding to a to-be-interpolated pixel in the plurality of the images sensed by the plurality of image sensors as an image channel value to be assigned to the to-be-interpolated pixel.

18. The method of claim 13, wherein when a to-be-interpolated image channel of a to-be-interpolated pixel is not a predetermined image channel, the calculating of the image channel values comprises determining a value calculated using image channel values of pixels adjacent to a to-be-interpolated pixel in the plurality of the images sensed by the plurality of image sensors as an image channel value to be assigned to the to-be-interpolated pixel.

19. The method of claim 18, wherein the calculating of the image channel values comprises comparing a difference between image channel values of two horizontally adjacent pixels to a to-be-interpolated pixel in the plurality of the images sensed by the plurality of the image sensors and a difference between image channel values of two vertically adjacent pixels to the to-be-interpolated pixel, and determining a mean value of the image channel values having a smaller difference as an image channel value to be assigned to the to-be-interpolated pixel.

20. The method of claim 18, wherein the calculating of the image channel values comprises comparing a difference between image channel values of two horizontally adjacent pixels to a to-be-interpolated pixel in the plurality of the images sensed by the plurality of the image sensors and a difference between image channel values of two vertically adjacent pixels to the to-be-interpolated pixel, and
wherein when the difference between the image channel values of the two horizontally adjacent pixels is the same as the difference between the image channel values of the two vertically adjacent pixels, the interpolation unit determines a mean value of the image channel values of the two horizontally adjacent pixels and the two vertically adjacent pixels as an image channel value to be assigned to the to-be-interpolated pixel.

21. An image generating apparatus comprising:
a multichannel filter unit having a plurality of filters, each of the plurality of filters having different patterns corresponding to a plurality of image channels, so that images pass through different ones of the plurality of filters;
an image sensing unit including a plurality of image sensors to sense segmented images passed through the different filters;
an interpolation unit calculating image channel values of pixels of the segmented sensed images; and
an image combination unit to combine the segmented images to generate a single desired image.

* * * * *